(12) United States Patent
Miller et al.

(10) Patent No.: US 6,860,645 B2
(45) Date of Patent: Mar. 1, 2005

(54) OPTICAL FIBER CABLE CONNECTOR ASSEMBLY WITH STRAIN RELIEF

(75) Inventors: Jeffrey Miller, Bethlehem, CT (US); Edward Warych, Bristol, CT (US)

(73) Assignee: Furukawa Electric North America, Inc., Norcross, GA (US)

( * ) Notice: Subject to any disclaimer, the term of this patent is extended or adjusted under 35 U.S.C. 154(b) by 0 days.

(21) Appl. No.: 10/606,413

(22) Filed: Jun. 26, 2003

(65) Prior Publication Data

US 2004/0264880 A1 Dec. 30, 2004

(51) Int. Cl.$^7$ ................................................ G02B 6/38
(52) U.S. Cl. .......................................... 385/81; 385/87
(58) Field of Search .............................. 385/87, 81, 76, 385/78

(56) References Cited

U.S. PATENT DOCUMENTS

| 3,999,837 | A | * | 12/1976 | Bowen et al. ................ 385/54 |
| 5,671,310 | A | * | 9/1997 | Lin et al. ..................... 385/78 |
| 5,732,175 | A | * | 3/1998 | Fan ............................. 385/87 |
| 5,943,460 | A | * | 8/1999 | Mead et al. .................. 385/81 |
| 6,390,688 | B1 | * | 5/2002 | Lutzen et al. ................ 385/87 |

FOREIGN PATENT DOCUMENTS

| EP | 0 486 189 A2/3 | 5/1992 |
| GB | 2 069 170 A | 8/1981 |

OTHER PUBLICATIONS

European Patent Office, Communication re EP Application 03028287.5 (Oct. 11, 2004).

\* cited by examiner

Primary Examiner—Chandrika Prasad
(74) Attorney, Agent, or Firm—Law Office of Leo Zucker

(57) ABSTRACT

A connector system for terminating an optical fiber cable having a protective outer jacket. The system includes a connector plug and a crimp insert having an axial bore. A distal end of the insert is formed to be joined to a proximal end of the connector plug. A first portion of the insert bore has a diameter corresponding to an outside diameter of the cable jacket. A second portion of the insert bore has a diameter corresponding to an outer diameter of an unjacketed end of the cable. The insert deforms when crimped at axially spaced positions on its periphery, correspondonding to the first and the second portions of the insert bore. Thus, both the outer jacket and the unjacketed end of the cable are restrained from axial movement with respect to the insert and connector plug.

20 Claims, 5 Drawing Sheets

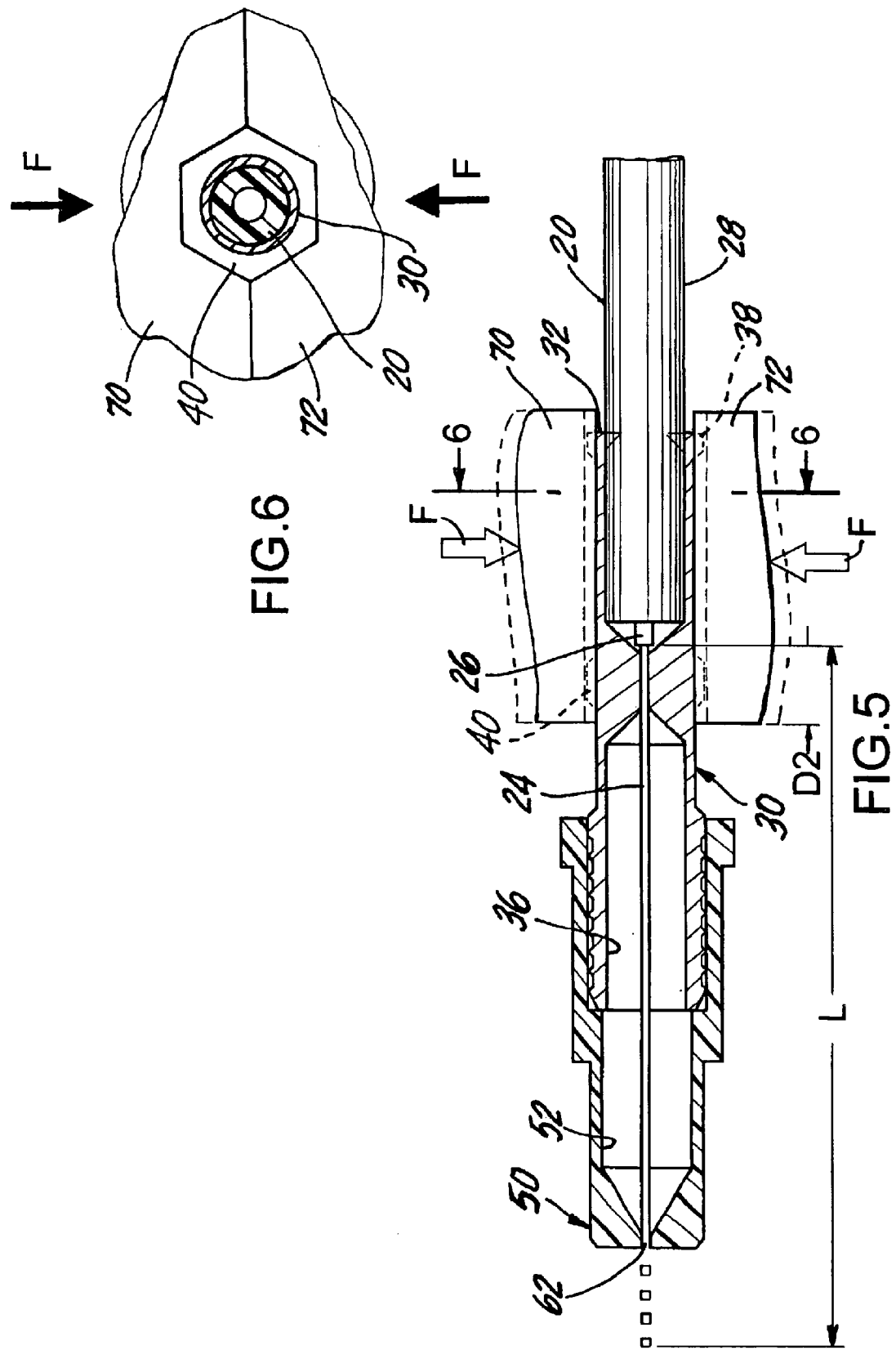

OPTICAL FIBER CABLE CONNECTOR ASSEMBLY WITH STRAIN RELIEF

BACKGROUND OF THE INVENTION

1. Field of the Invention

This invention relates to cable connector configurations, and particularly to a configuration for an optical fiber cable connector system.

2. Discussion of the Known Art

U.S. Pat. No. 5,455,880 (Oct. 3, 1995) discloses an optical fiber cable connector that can be used with polymer coated, glass optical fibers. The patented connector includes a connector plug having an axial bore, and a crimp ring also having an axial bore with a large diameter portion and a small diameter portion. A sleeve on the crimp ring forms the small diameter portion of the bore in the ring, and the sleeve is dimensioned to be received in the bore in the connector plug at one (proximal) end of the plug.

An optical fiber cable having an outer jacket, a clad core and an intermediate buffer layer, is partially stripped at one end of the cable to define a jacketed segment and an unjacketed segment. The stripped end of the cable is inserted through the large diameter portion and then through the small diameter portion of the crimp ring bore until the jacketed segment is disposed substantially within the large diameter portion, and the unjacketed segment projects out from the reduced diameter portion by a predetermined length.

The crimp ring is secured to the optical fiber cable by crimping its sleeve onto the unjacketed cable segment, and the unjacketed segment is inserted in the bore in the connector plug at the proximal end of the plug. A length of the unjacketed segment extends from the plug bore at the opposite (distal) end of the plug once the sleeve of the crimp ring is received in the proximal end of the plug. An annular flange on the crimp ring which surrounds the proximal end of the plug is then crimped to secure the ring to the plug. Finally, the length of the unjacketed cable segment extending from the distal end of the plug is cleaved, and the connector is ready for insertion into another, mating connector.

It will be appreciated that the connector of the '880 patent requires two distinct crimping operations for assembly with an optical fiber cable. The first crimp operation is performed on the crimp ring sleeve in order to secure the ring to the unjacketed segment of the cable, and the second crimp operation is performed on the annular crimp ring flange in order to fix the ring to the plug connector. Any forces tending to pull the stripped end of the cable out of the assembled connector will therefore be directed primarily through the unjacketed (i.e., reduced diameter) segment of the cable to the crimped sleeve of the ring. Thus, the connector may not be well suited for use in harsh environments where cable stresses combined with extreme temperature variations may result in a withdrawal or "pistoning" of a terminated cable with respect to the connector.

U.S. Pat. No. 5,923,805 (Jul. 13, 1999) relates to a connector for terminating a fiber cable having a plastics core, e.g., a polymethylmethacrylate (PMMA) core whose diameter is about 1.0 millimeter (mm) with a fluoropolymer cladding of less than about 25 microns ($\mu$m) thickness. The fiber is typically jacketed with a protective, opaque material such as a 0.5 mm thick layer of nylon. The connector includes a housing in which a metallic guide tube is retained, and a prepared end portion of the cable including the cable jacket is inserted through the guide tube. The guide tube is crimped about the cable to restrain cable from withdrawing from the connector housing when tensile forces are applied to the cable.

There is currently a strong demand for plastics optical fiber cables, particularly by the automotive industry wherein various standard and accessory automotive equipment are being adapted to cooperate with one another through a multimedia fiber-optic network. Known as Media Oriented Systems Transport or "MOST", the network is optimized for automotive applications. Presently, about 20 international car manufacturers and more than 50 key component suppliers are adopting and working to implement MOST technology.

The configuration of the MOST network features relatively low cost interfaces for common devices such as microphones and speakers. At the same time, it allows more intelligent devices like integrated cellular telephones, digital radio receivers, GPS navigation modules, security systems, CD changers, voice recognition and activation systems, video displays and the like, each to determine those features and functions provided by all other devices that are coupled to the network. Control mechanisms may thus be established to eliminate unnecessary distractions should various subsystems seek to communicate with the driver of a MOST equipped vehicle. See generally, Internet web site <www.mostcooperation.com>.

The MOST standard specifies geometrical form factors for interfaces between a plug or "nose" of an optical fiber cable connector and a mating connector, without regard to a specific type of optical fiber carried by an associated cable. See MOST Specification Of Physical Layer, Rev 1.0 (February 2001) at pages 17–18, which may be downloaded through the above mentioned web site and is incorporated by reference.

Current MOST networks typically use an all plastics optical fiber cable with a 1000 $\mu$m diameter core for data transmission. But developing automotive applications are expected to surpass the optical bandwidth and environmental limitations of plastics core optical fibers, however. Accordingly, a polymer clad, pure silica core optical fiber such as, e.g., HCS® fiber available from OFS Fitel, is a valuable substitute for plastics core fiber and will satisfy future optical and environmental requirements for MOST networks. A connector system capable of providing a reliable interface for either polymer clad/silica core or all-plastics optical fiber cables, and which will satisfy present and future bandwidth and environmental requirements of MOST and other emerging fiber-optic networks, is therefore highly desirable.

SUMMARY OF THE INVENTION

According to the invention, a connector system for terminating an end of an optical fiber cable having a protective outer jacket, includes a connector plug having a first axis, and an axial bore formed to extend between a proximal end and a distal end of the connector plug. A crimp insert has a second axis, and an axial bore formed to extend between a proximal end and a distal end of the insert. The distal end of the insert is formed to be joined to the proximal end of the connector plug. A first portion of the bore in the insert opens at the proximal end of the insert and has a first diameter that corresponds to the outside diameter of the outer jacket of the cable. A second portion of the bore in the insert has a second diameter that corresponds to an unjacketed end of the cable.

The crimp insert is constructed and arranged to deform in response to a crimp force applied at axially spaced positions on its outer periphery corresponding to the first and the second portions of the insert bore. Thus, both the outer jacket and the unjacketed end of the cable are restrained from axial movement with respect to the joined insert and connector plug.

For a better understanding of the invention, reference is made to the following description taken in conjunction with the accompanying drawing and the appended claims.

BRIEF DESCRIPTION OF THE DRAWING

FIG. 5 is a cross-sectional view of the assembled plug and insert as in FIG. 4, showing a prepared end of an optical fiber cable being operatively terminated by the assembly; and FIG. 6 is a sectional view taken along line 6—6 in FIG. 5, showing a pair of crimp jaws acting on the outer periphery of the crimp insert.

DETAILED DESCRIPTION OF THE INVENTION

Figure 1:
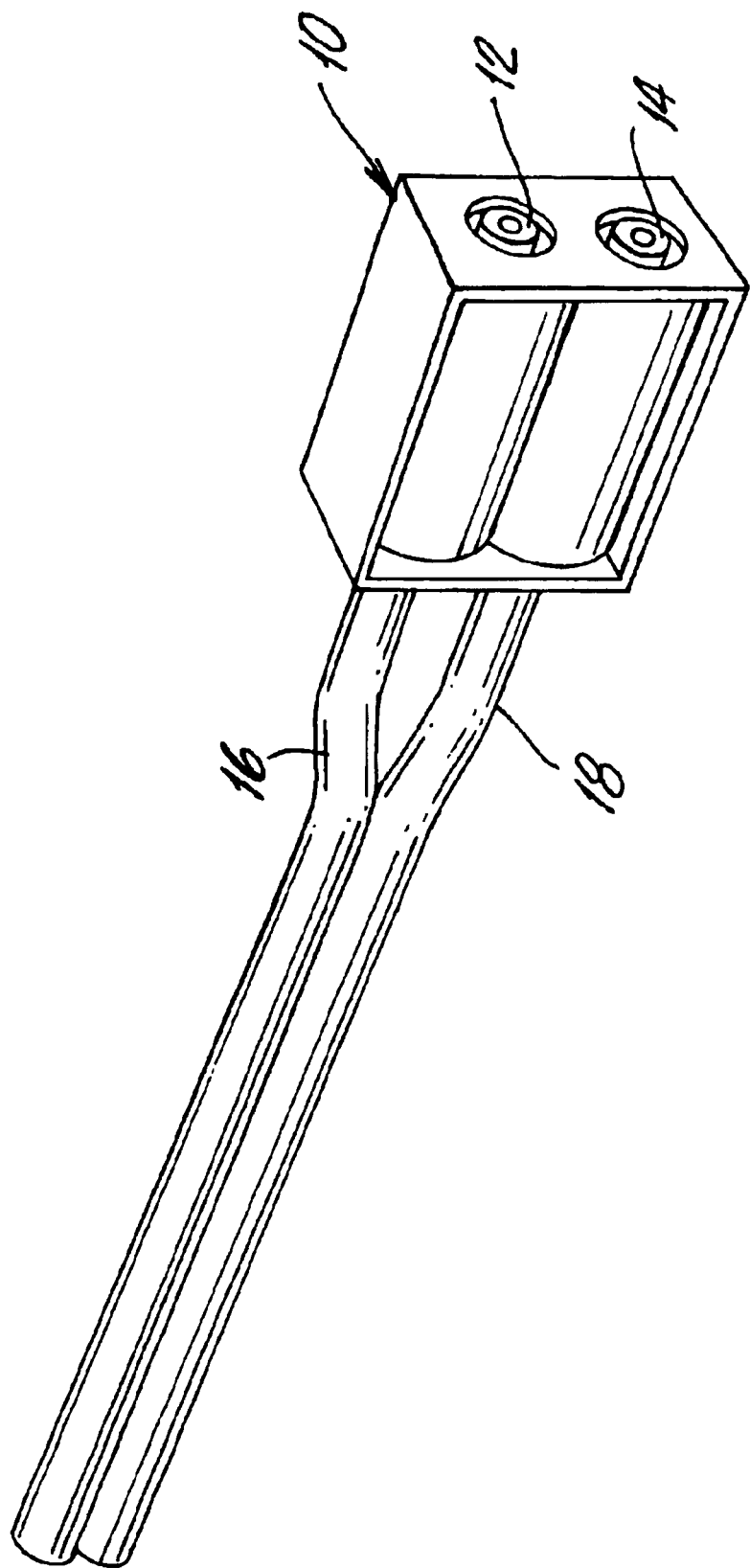
FIG. 1 is a perspective view of a connector body which houses two optical fiber cables that are terminated according to the invention.

FIG. 1 shows a connector body 10 which houses a pair of terminations 12, 14. The terminations 12, 14 serve to present end faces of two optical fiber cables 16, 18 for coupling with devices associated with a mating connector (not shown). The connector body 10 may be dimensioned and formed according to, for example, specifications set out for MOST networks wherein connector housings typically contain a pair of cable terminations. Although not shown in FIG. 1, a latch finger may also be formed on a side wall of the connector body 10 for engaging a catch in the mating connector, thus ensuring that the end faces of the cables 16, 18 are maintained in proper alignment with the devices associated with the mating connector.

Figure 2:
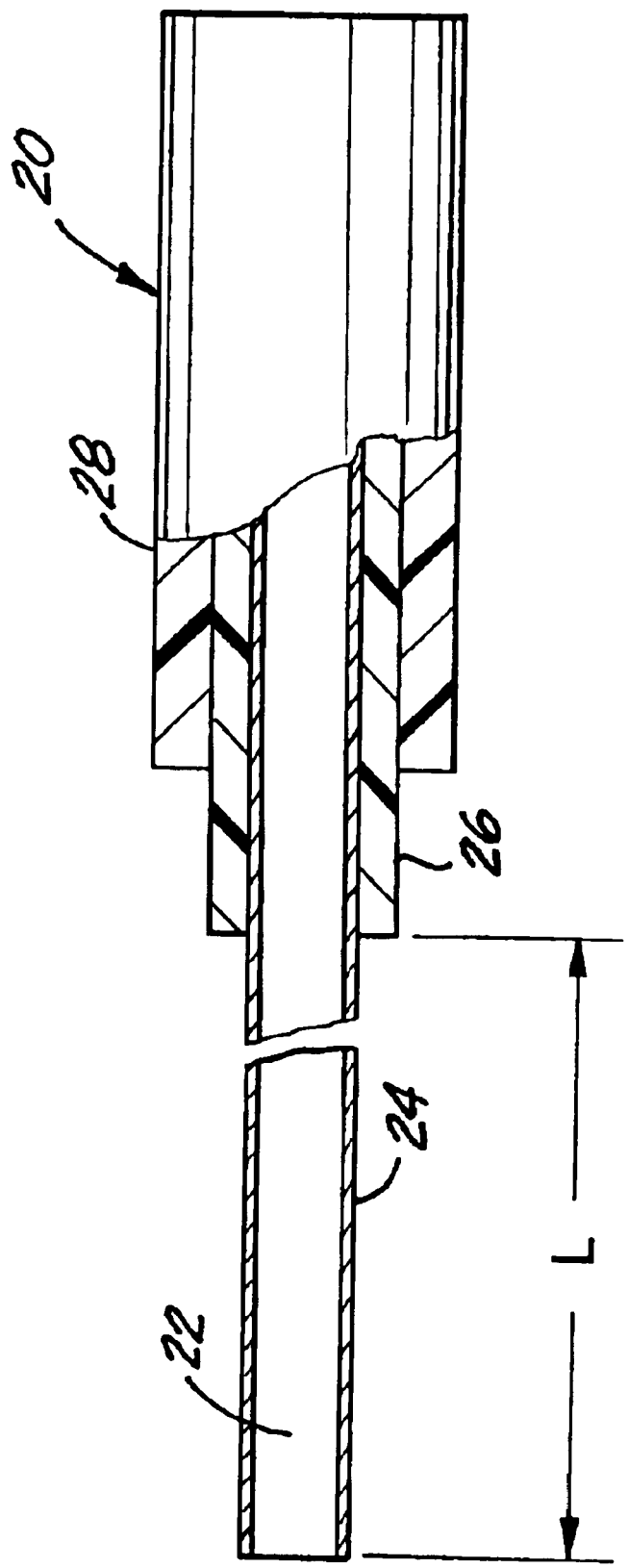
FIG. 2 illustrates an end of an optical fiber cable prior to termination.

FIG. 2 shows an end of an optical fiber cable 20 prior to termination. For example, the cable 20 may comprise a silica core 22 with a hard polymer coating 24 which serves as a cladding about the silica core 22. A soft plastics coating is typically provided about the cladding 24 to form a buffer layer 26. The buffer layer 26 allows for deformation of and reduces forces applied to the core cladding 24. See J. Hecht, Understanding Fiber Optics, Prentice Hall (3$^{rd}$ ed. 1999) at pages 152–53, which are incorporated by reference.

An outer jacket 28 of, e.g., polyvinyl chloride (PVC) protectively surrounds the cladded fiber core 22 and intermediate buffer layer 26. Prior to termination, a determined length of the cable jacket 28 is removed from the end of the cable 20 as shown in FIG. 2 and described further below. A length of the buffer layer 26 may be left exposed as in FIG. 2, leaving a desired length L of the cladded fiber core 22 exposed without the surrounding buffer layer 26.

Figure 3:
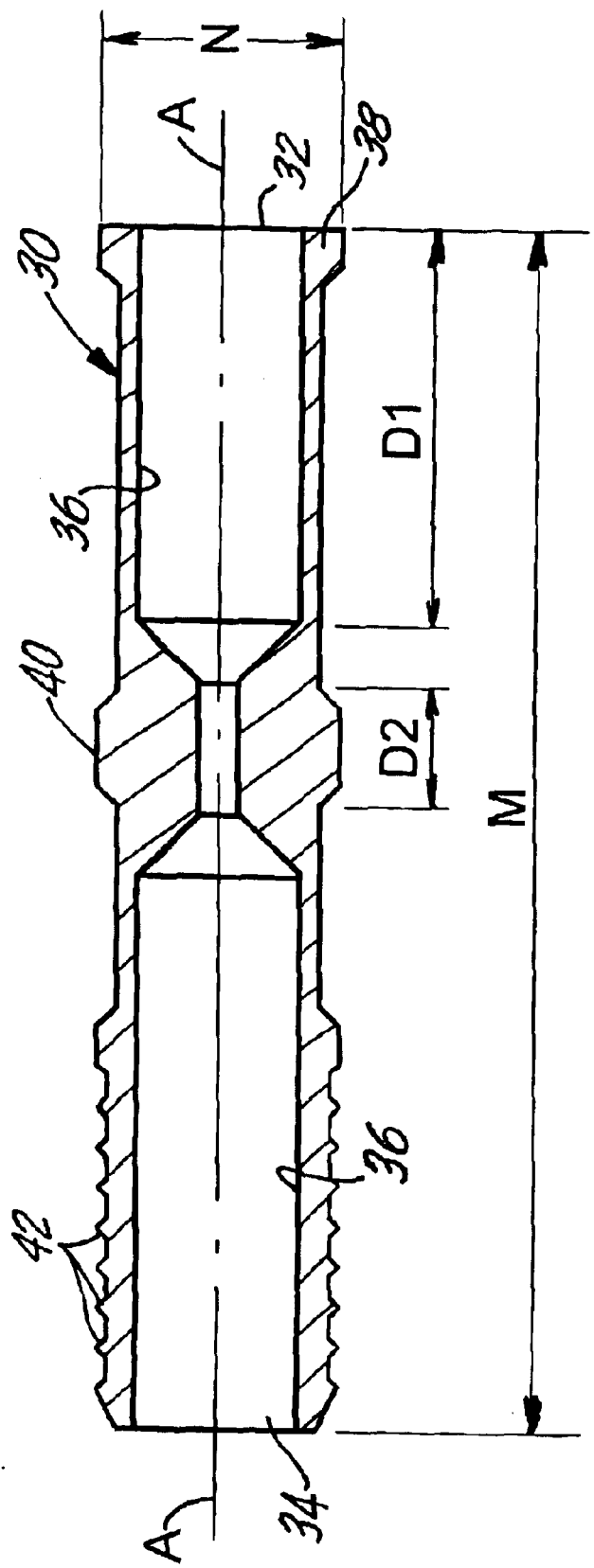
FIG. 3 is a cross-sectional view of a cable crimp insert according to the invention.

FIG. 3 is a cross-sectional view of a cable crimp insert 30 according to the invention. The insert 30 has a generally cylindrical shape and is preferably formed of a strong but deformable material such as, e.g., aluminum or other metal or metal alloy having a relatively small coefficient of expansion for the temperature range to be encountered. For example, the MOST specification calls for reliable component performance at temperatures ranging between −40 degrees C. and +85 degrees C.

The crimp insert 30 has an overall length M of, e.g., about 0.59 inches (15.0 mm), a proximal end 32 and a distal end 34. The insert 30 also has an overall outside diameter N of, e.g., 0.12 inch (3.0 mm). The insert 30 has a bore 36 centered about its axis A, wherein a first diameter portion D1 of the bore 36 opens at the proximal end 32 of the insert and is dimensioned to accommodate the outer diameter of the cable jacket 28 (FIG. 2) a typical value of which is, e.g., about 0.08 inch (2.0 mm).

The crimp insert bore 36 also has a second, reduced diameter portion D2 intermediate the first diameter portion D1 and the distal end 34 of the insert. In a first embodiment of the invention, the diameter of the portion D2 corresponds to the outer diameter of the cladding 24 over the core 22 of the cable 20 (FIG. 2), a typical value of which is, e.g., about 0.015 inch (0.4 mm). The axial length of the bore portion D2 is, e.g., about 0.06 inch (1.6 mm). The first embodiment requires that only a relatively short length of the buffer layer 26 be allowed to remain with respect to the exposed length L of the clad core, when stripping the outer jacket 28 from the end of the cable 20 as shown in FIG. 2. In this embodiment, the exposed length L of the clad core defines an "unjacketed end" of the cable 20.

In a second embodiment of the invention, the diameter of the bore portion D2 corresponds to the outer diameter of the buffer layer 26, and a sufficient length of the buffer layer 26 is left exposed when the cable jacket 28 is removed from the cable end (FIG. 2) so that the buffer layer 26 extends entirely or substantially entirely in the bore portion D2 during cable termination, as explained below. In this embodiment, both the exposed length of the buffer layer 26 and a determined exposed length of the clad core define an unjacketed end of the cable 20. The diameter of the bore portion D2 is then typically, for example, about 0.020 inch (0.5 mm). The axial length of the bore portion D2 may remain at about 0.06 inch (1.6 mm) as in the first embodiment.

A first annular crimp concentrator or ring 38 is formed on the circumference of the crimp insert 30, at the proximal end 32 of the insert as seen at the right in FIG. 3. A second annular crimp ring 40 is formed on the circumference of the insert so as to encompass a central region of the bore portion D2 in the insert. Also, a number of axially spaced, annular ribs 42 are formed on the circumference of the crimp insert 30 between the bore portion D2 and the distal end 34 of the insert, as seen toward the left in FIG. 3. The ribs 42 function to establish a firm joint between the insert and the connector plug 50 when the two parts are assembled as explained below.

Figure 4:
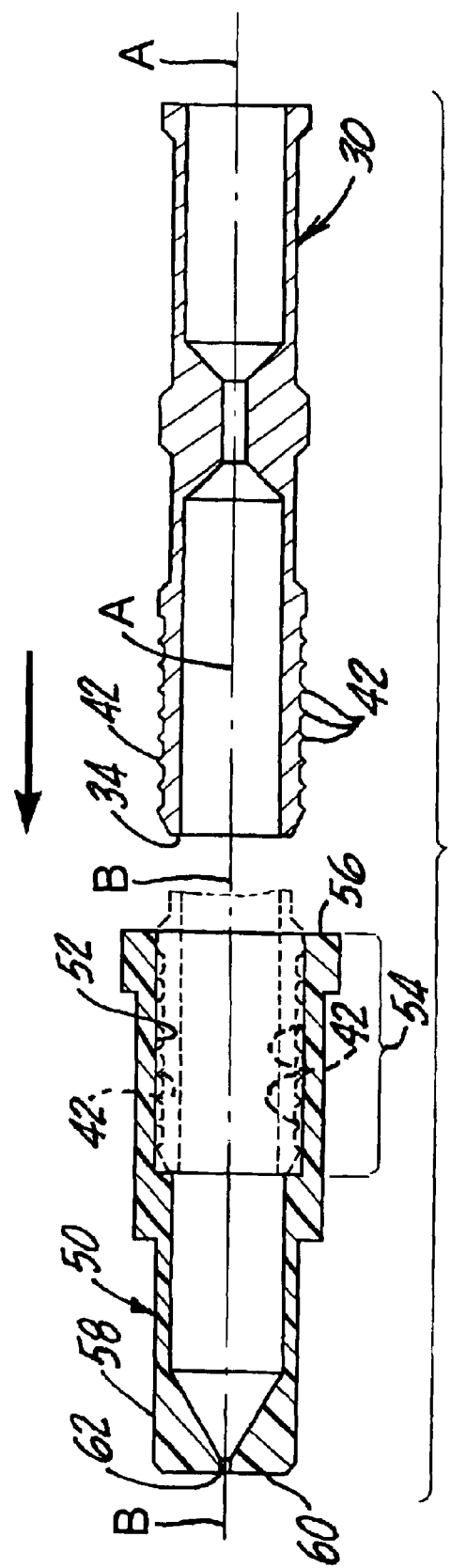
FIG. 4 is a cross-sectional view of the crimp insert of FIG. 3, after being joined to a proximal end of a connector plug according to the invention.

FIG. 4 is a cross-sectional view showing the crimp insert 30 of FIG. 3 in axial alignment with a generally cylindrical connector plug 50 (sometimes referred to as a "ferrule nose"), prior to being joined to the plug according to the invention. In the present embodiment, the nose or plug 50 is preferably formed from a thermoplastic material that can be molded into the desired shape. One such material, available from General Electric Company, is sold under the name "Ultem".

The connector plug 50 has a bore 52 that is centered about a plug axis B. A first portion 54 of the bore 52 opens at a proximal end 56 of the plug, and the first bore portion has such a diameter as to allow the plug 50 to receive and retain the distal end 34 of the crimp insert 30 when the latter is urged axially into the bore portion 54 using, for example, known ultrasonic heating and assembling techniques. When using such an assembly procedure, the initial (cold) diameter of the first bore portion 54 at the proximal end of the plug is slightly less than the outside diameters of the ribs 42 on the distal end of the insert 30. Alternatively, the diameters of the bore portion 54 and the ribs 42 may be set as to allow an axial "press fit" between the crimp insert and the connector plug, without a preliminary heating step.

The overall axial length of the plug 50 is preferably about 0.44 inch (11.15 mm), and a typical axial length of the first bore portion 54 is, e.g., about 0.2 inch (5.0 mm). A distal end 58 of the plug has a diameter of, e.g., about 0.115 inch (2.913 mm), and a wall 60 at the distal end 58 has a central opening 62 of a diameter just sufficient to allow passage of a free end of the length L of the exposed cladded core of the cable 20 (FIG. 2). A typical diameter of the central opening 62 at the distal end 58 of the connector plug, is about 0.009 inch (0.230 mm) for applications involving a cable such as OFS Fitel's HCS fiber which has a 200 $\mu$m core.

FIG. 5 is a cross-sectional view of the assembled connector plug 50 and crimp insert 30, after a stripped end of the cable 20 is inserted through and operatively terminated by the assembly. The assembled connector plug and crimp insert may also be defined as a "connector ferrule" unit. In FIG. 5, the length L of the fiber core 22 with cladding 24 is inserted axially into the proximal end 32 of the insert, through the second diameter bore portion D2 in the insert, and through the bore 52 in the connector plug 50 to exit from the central opening 62 in the plug end wall 60.

A compression force F is applied simultaneously on the two crimp rings 38, 40 on the crimp insert 30. The force F may be applied, for example, by a set of confronting hex crimp jaws 70, 72 as seen in FIG. 6. As depicted in FIGS. 5 and 6, when the hex jaws act on the crimp rings, the axial bore 36 in the insert 30 closes uniformly about the circumference of the outer jacket and the unjacketed end of the cable 20. Preferably, and as shown in FIG. 5, the jaws 70, 72 have sufficient width in the axial direction to exert a crimp force simultaneously on both of the crimp rings 38, 40 on the insert 30. Thus, by way of a single crimping operation, the cable jacket 28 is crimped and positively retained beneath the first ring 38 at the proximal end 32 of the insert, while a portion of the exposed cladded core of the cable is crimped and positively secured within the bore portion D2 of the insert beneath the second ring 40.

The cable termination process is completed by cleaving and, if desired, polishing the free end of the cladded core exiting from the opening 62 in the plug end wall, in a conventional manner. For example, a commercially available cleave tool such as type CT-2 available from OFS Fitel may be used to form a clean fiber end face that is substantially flush with the plug end wall 60. One or more cables each of which is terminated by the assembled connector plug 50 and insert 30 may then be supported in a connector housing such as the housing 10 in FIG. 1, so that the end faces of the cables will be operatively coupled to other cables or optical devices associated with a mating connector or socket.

It will be appreciated that the crimp insert 30 and the connector plug 50 can be provided as preassembled, connector ferrule units. Accordingly, both the time and the equipment needed for terminating large numbers of optical fiber cables in a manufacturing environment can be significantly reduced.

The connector system disclosed herein is especially well suited for terminating glass core/polymer clad optical fiber cables as well as all plastics fiber cables, whether in MOST or in other network applications. The present system also provides a degree of retention for the terminated cables which, as far as is known, has not been achieved by other crimping techniques. Importantly, the system lends itself to an automated cable termination procedure that involves few steps, thus minimizing per unit manufacturing costs.

While the foregoing represents preferred embodiments of the invention, it will be understood by those skilled in the art that various modifications and changes may be made without departing from the spirit and scope of the invention, and that the invention includes all such modifications and changes as come within the scope of the following appended claim.

We claim:

1. A connector system for terminating an end of an optical fiber cable including an outer jacket, comprising:

a connector plug having a first axis, a proximal end, a distal end opposite the proximal end along the direction of the first axis, and an axial bore formed to extend between the proximal and the distal ends of the connector plug; and a crimp insert having a second axis, a proximal end, a distal end opposite the proximal end along the direction of the second axis, and an axial bore formed to extend between the proximal and the distal ends of the crimp insert;

wherein the distal end of the crimp insert is formed and dimensioned to be joined to the proximal end of the connector plug;

a first portion of the axial bore in the crimp insert opens at the proximal end of the insert and has a first diameter that corresponds to an outside diameter of the outer jacket of the optical fiber cable;

a second portion of the axial bore in the crimp insert has a second diameter that corresponds to an outer diameter of an unjacketed end of the cable; and the crimp insert is constructed and arranged to deform in response to a crimp force applied by a set of jaws on the outer periphery of the insert in the vicinity of the first and the second portions of the axial bore in the insert, so that the axial bore closes uniformly about both (i) the outer Jacket, and (ii) the unjacketed end of the cable, and the outer jacket and the unjacketed end of the cable are restrained from axial movement with respect to the joined insert and connector plug.

2. A connector system according to claim 1, wherein the connector plug comprises a thermoplastics material.

3. A connector system according to claim 1, wherein the crimp insert comprises a metallic material.

4. A connector system according to claim 3, wherein the metallic material comprises aluminum.

5. A connector system according to claim 1, wherein the distal end of the crimp insert is dimensioned and arranged for insertion in the axial bore in the connector plug at the proximal end of the connector plug.

6. A connector system according to claim 5, wherein the crimp insert has one or more ribs formed on its circumference toward the distal end of the insert for establishing a firm joint when inserted in the connector plug.

7. A connector system according to claim 1, wherein the crimp insert has one or more crimp rings formed on its circumference for application of the crimp force.

8. A connector system according to claim 1, wherein the crimp insert has at least two axially spaced crimp rings formed on its circumference for application of the crimp force from a common set of crimping jaws.

9. A connector system according to claim 8, wherein a first crimp ring is formed substantially at the proximal end of the crimp insert, and a second crimp ring is formed at such a position as to encompass a central region of the second portion of the axial bore in the crimp insert.

10. An optical fiber cable and connector assembly, comprising:

a length of an optical fiber cable having at least an outer jacket and a clad core;

a connector ferrule unit operative to present an end face of the clad core to an outside connector or socket, the ferrule unit including:

a connector plug having a first axis, a proximal end, a distal end opposite the proximal end along the direction of the first axis, and an axial bore formed to extend between the proximal and the distal ends of the connector plug; and a crimp insert having a second axis, a proximal end, a distal end opposite the proximal end along the direction of the second axis, and an axial bore formed to extend between the proximal and the distal ends of the crimp insert;

wherein the distal end of the crimp insert is formed and dimensioned to be joined to the proximal end of the connector plug;

a first portion of the axial bore in the crimp insert opens at the proximal end of the insert and has a first diameter that corresponds to an outside diameter of the outer jacket of the optical fiber cable;

a second portion of the axial bore in the crimp insert has a second diameter that corresponds to an outer diameter of an unjacketed end of the cable; and the crimp insert is constructed and arranged to deform in response to a crimp force applied by a set of jaws on the outer periphery of the insert in the vicinity of the first and the second portions of the axial bore in the insert, so that the axial bore closes uniformly about both (i) the outer jacket, and (ii) the unjacketed end of the cable, and the outer jacket and the unjacketed and of the cable are restrained from axial movement with respect to the joined insert and connector plug; and a connector housing for supporting the connector ferrule unit in operative relation to the outside connector or socket.

11. An optical fiber cable and connector assembly according to claim 10, comprising two lengths of said optical fiber cable each terminated by a corresponding ferrule unit, and the connector housing is constructed and arranged to support the ferrule units associated with the lengths of cable in operative relation to the outside connector or socket.

12. An optical fiber cable and connector assembly according to claim 10, wherein the connector plug comprises a thermoplastics material.

13. An optical fiber cable and connector assembly according to claim 10, wherein the crimp insert comprises a metallic material.

14. An optical fiber cable and connector assembly according to claim 13, wherein the metallic material comprises aluminum.

15. An optical fiber cable and connector assembly according to claim 10, wherein the distal end of the crimp insert is dimensioned and arranged for insertion in the axial bore in the connector plug at the proximal end of the connector plug.

16. An optical fiber cable and connector assembly according to claim 15, wherein the crimp insert has one or more ribs formed on its circumference toward the distal and of the insert for establishing a firm joint when inserted in the connector plug.

17. An optical fiber cable and connector assembly according to claim 10, wherein the crimp insert has one or more crimp rings formed on its circumference for application of the crimp force.

18. An optical fiber cable and connector assembly according to claim 10, wherein the crimp insert has at least two axially spaced crimp rings formed on its circumference for application of the crimp force from a common set of crimping jaws.

19. An optical fiber cable and connector assembly according to claim 18, wherein a first crimp ring is formed substantially at the proximal end of the crimp insert, and a second crimp ring is formed at such a position as to encompass a central region of the second portion of the axial bore in the crimp insert.

20. An optical fiber cable and connector assembly according to claim 10, wherein the optical fiber cable has a silica core with a polymer cladding.

* * * * *